United States Patent [19]
Alberts et al.

[11] 3,962,371
[45] June 8, 1976

[54] WEATHER-RESISTANT THERMOPLASTS

[75] Inventors: Heinrich Alberts, Cologne; Herbert Bartl, Odenthal-Hahnenberg; Richard Prinz, Leverkusen; Salah Elabd Elghani; Winfried Fischer, both of Cologne, all of Germany

[73] Assignee: Bayer Aktiengesellschaft, Germany

[22] Filed: Dec. 6, 1974

[21] Appl. No.: 530,171

[30] Foreign Application Priority Data
Dec. 12, 1973   Germany............................ 2361717

[52] U.S. Cl. .......................... 260/876 R; 260/878 R
[51] Int. Cl.² .................. C08L 51/04; C08L 23/08; C08L 23/14
[58] Field of Search .................... 260/876 R, 878 R

[56] References Cited
UNITED STATES PATENTS

| | | |
|---|---|---|
| 3,461,188 | 8/1969 | Baer............................... 260/878 R |
| 3,742,090 | 6/1973 | Kiuchi et al..................... 260/876 R |
| 3,848,025 | 11/1974 | Alberts et al. ................. 260/878 R |

*Primary Examiner*—Murray Tillman
*Assistant Examiner*—Thurman K. Page
*Attorney, Agent, or Firm*—Connolly and Hutz

[57] ABSTRACT

Weather-resistant thermoplastic moulding compounds of mixtures of
- A. copolymers of (meth)acrylonitrile, of at least one aromatic vinyl compound and of optionally at least one monoolefin, and
- B. a graft copolymer of an ethylene/vinyl ester copolymer as graft substrate and grafted polymerized units of (meth)acrylonitrile of at least one aromatic monovinyl compound and of optionally at least one aliphatic monoolefin.

12 Claims, No Drawings

WEATHER-RESISTANT THERMOPLASTS

This invention relates to moulding compounds prepared from mixtures of copolymers consisting mainly of styrene and acrylonitrile (SAN resins) and graft polymers which have been synthesised from ethylene/vinyl ester copolymers, the graft substrate and a mixture of aromatic monovinyl compounds, (meth)-acrylonitrile and optionally monoolefines which constitute the graft monomers.

It is known to produce SAN moulding compounds with high impact resistance and notched impact resistance by mixing styrene/acrylonitrile resins with polymers which have rubbery elastic properties or which are capable of elasticising SAN resins because they contain an elastomer component. The mechanical properties of the thermoplast can thus be adjusted by the amount of elasticising component included. Thus, for example, SAN resins with high impact strength can be obtained by mixing SAN copolymers with polybutadiene, butadiene copolymers or graft polymers of styrene/acrylonitrile mixtures on polybutadiene or butadiene copolymers [see H. Ebneth in Gummi, Asbest, Kunststoffe No. 6 (1962) 522 and Ind. Plastiques Mod. 16 (6) (1964) 85]. Similarly graft polymers based on ethylenepropylene-rubber are used as modifiers to improve the impact resistance of SAN resins (see German Offenlegungsschrift No. 1,745,945).

The above mentioned graft polymers can easily be mixed with SAN resins to product mixtures which have excellent mechanical strength properties but are unsuitable for external use because of their poor resistance to ageing and weathering.

It was therefore an object of this invention to produce styrene-acrylonitrile resins which would not only be distinguished by their good mechanical strength properties and the ease with which they can be processed but by also having excellent resistance to weathering. It was surprisingly found that this could be achieved by mixing SAN resins with graft polymers of ethylene/vinyl ester copolymers as graft substrate and grafted units of monomer mixtures of (meth)-acrylonitrile, aromatic vinyl compounds and optionally monoolefines.

This invention therefore relates to thermoplastic moulding compounds of mixtures of A. 10 to 90% by weight, preferably 30 to 75% by weight of a copolymer of
 I. 10 to 85% by weight, preferably 15 to 40% by weight of (meth)-acrylonitrile and
 II. 10 to 90% by weight, preferably 60 to 85% by weight, of at least one aromatic vinyl compound and
 III. 0 to 20% by weight, preferably 0,1 to 5% by weight, of at least one monoolefin,
 the sum of the components I to III being 100%, and
B. 90 to 10% by weight, preferably 25 to 70% by weight, of a graft copolymer of
 IV. 10 to 70% by weight, preferably 35 to 55% by weight, of an ethylene/vinyl ester copolymer containing 25 to 75% by weight of vinyl ester built into the copolymer and
 V. 90 to 30% by weight, preferably 65 to 45% by weight of polymerised units of
  a. 15 to 85% by weight, preferably 15 to 35% by weight of (meth)acrylonitrile,
  b. 85 to 15% by weight, preferably 65 to 85% by weight, of at least one aromatic monovinyl compound and
  c. 0 to 20% by weight, preferably 0,1 to 10% by weight of at least one monoolefin containing 2 to 18 carbon atoms, the sum of A + B being 100 and the sum of the component (a) to (c) 100 and the sum of the components IV and V 100.

Components (A) used for the mixtures according to the invention are copolymers of (meth)-acrylonitrile, aromatic monovinyl compounds such as styrene, alkylstyrenes which are substituted in the nucleus and contain 1 to 5 carbon atoms in the alkyl group, such as 4-methylstyrene, α-methylstyrene or halogenated styrenes such as 4-chlorostyrene or mixtures thereof and aliphatic monoolefins containing 2 to 18 carbon atoms, preferably 2 to 4 carbon atoms such as propylene, isobutylene or butene-1.

The copolymers may be prepared in solution. Suitable solvents include tetrahydrofuran, dimethylformamide, hexamethylphosphoric acid triamide, acetone, ethyl acetate and aromatic solvents such as benzene, toluene or chlorobenzene, The copolymers may also be prepared by suspension polymerisation in an aqueous or organic continuous phase. The organic solvents which are particularly suitable for this method are alcohols such as methanol, ethanol or tert.butanol. The copolymers are preferably prepared by solvent-free bead polymerisation or polymerisation in emulsion. The intrinsic viscosities of the copolymers determined in a solution in dimethylformamide at 25°C are between $(\eta) = 0.5$ and $(\eta) = 10.5$.

The components (A) are preferably copolymers of styrene and acrylonitrile obtained by emulsion, suspension or mass polymerisation and having intrinsic viscosities determined in dimethylformamide at 25°C of $(\eta) = 0.5$ to $(\eta) = 2.0$. The ratio of styrene : acrylonitrile in the copolymers may advantageously be within the azeotropic range of the styreneacrylonitrile system but, in principle, any composition capable of giving rise to fluid polymers may be used.

Preferred thermoplastic moulding compounds therefore contain the following as component (A):
 30 to 75% by weight of a copolymer of
 I. 15 to 40% by weight of acrylonitrile,
 II. 60 to 85% by weight of styrene and
 III. 0,1 to 5% by weight of monoolefin.

The graft polymers used according to the invention which consist of ethylene/vinyl ester copolymers with grafted units of aromatic vinyl compounds and (meth) acrylonitrile may be prepared by the process according to British Pat. Specification No. 917,499 or according to German Offenlegungsschriften Nos. 1,964,479 and 2,137,780.

The preferred graft polymers of ethylene/vinyl ester copolymers with grafted units of a mixture of aromatic vinyl compounds, (meth)acrylonitrile and α-olefines containing 2 to 18 carbon atoms may be prepared by the process according to German Offenlegungsschrift No. 2,215,588 or according to German Offenlegungsschrift No. 2,305,681.

The ethylene/vinyl ester copolymers contain 25 to 75% by weight, preferably 35 to 55% by weight, of vinyl esters built into them.

The vinyl esters may be organic vinyl esters of saturated monocarboxylic acids with 1 to 18 carbon atoms which may be substituted by halogen, in particular by chlorine, or aromatic monocarboxylic acids with 7 to 11 carbon atoms, for example the following: vinyl formate, vinyl acetate, vinyl propionate, vinyl chloropropionate, vinyl butyrate, vinylisobutyrate, vinyl caproate, vinyl laurate, vinyl myristate, vinyl stearate and vinylbenzoate. Vinyl acetate being preferred.

The ethylene/vinyl ester copolymers are prepared by the known processes of high pressure or medium pressure synthesis, optionally in solvents such as tertiary butanol.

The ethylene/vinyl ester copolymers prepared by the high pressure synthesis process have melt index values of between 0.1 and 100, preferably between 1.0 and 10, and in particular 4.5 to 6. The intrinsic viscosities determined in tetraline at 120°C are generally between 0.6 and 1.5. The molecular weights determined by the light scattering method are preferably between 50,000 and 1,000,000. The non-uniformity U defined as $M_w/M_n - 1$ (G. V. Schulz, Z.phys. Chem. (B) 43 (1939) pages 25–34) is from 5 to 30. These copolymers dissolve most readily in hot hydrocarbons.

The graft polymers used for producing the moulding compounds according to the invention are primarly those based on ethylene/vinyl acetate and copolymers which contain 25 to 75% by weight, in particular 35 to 55% by weight of vinyl acetate built into the copolymer and which have Mooney viscosities (DIN 53 523, ML 4' (100°C)) of about 8 to 55. The $\eta$-values (Intrinsic viscosity of the soluble graft polymers determined in dimethylformamide at 25°C or chlorobenzene at 120°C) are in the region of 0.5 to 4.5 (100 ml/g). The graft monomers used may be aromatic vinyl monomers such as styrene, alkylstyrenes which are substituted in the nucleus and contain 1 to 5 carbon atoms in the alkyl group such as 4-methylstyrene, α-methylstyrene, halogenated styrenes such as 4-chlorostyrene or mixtures thereof, preferably styrene, methacrylonitrile and/or acrylonitrile. Aliphatic monoolefines containing 2 to 18, and preferably 2 to 8 carbon atoms are used as molecular weight regulators. The following are specific examples of suitable monoolefines: ethylene, propylene, butene-1, butene-2, isobutylene, 2-methylbutene-2, 3-methylbutene-1, diisobutylene, triisobutylene, pentene-1, 4-methylpentene-1, octadecene-1, cyclopentene. Propylene, butene-1, isobutylene or mixtures thereof are preferred.

Particularly preferred thermoplastic moulding compounds which have high impact strength and notched impact strength and can be processed within a wide range of temperatures consist of
A. 30 to 75% by weight of a styrene-(meth)acrylonitrile resin which has the composition already indicated above and
B. 25 to 70% by weight of a graft copolymer of
  IV. 10 to 70% by weight, preferably 35 to 55% by weight of an ethylene/vinyl acetate copolymer containing 35 to 55% by weight of vinyl acetate and
  V. 90 to 30% by weight, preferably 65 to 45% by weight of polymerised units of
    a. 15 to 35% by weight of (meth)acrylonitrile,
    b. 65 to 85% by weight of styrene or 2-methylstyrene and
    c. 0,1 to 10% by weight preferably 0,1 to 5% by weight of at least one monoolefine containing 2 to 18 carbon atoms, the sum of the components A and B being 100, the sum of components a. to c. being 100 and the sum of components IV and V being 100.

The graft polymers may be obtained by dissolving ethylene/vinyl ester copolymers, for example using tert.butanol as solvent, and then adding the graft monomers, for example styrene and acrylonitrile, and an α-olefine as molecular weight regulator and then releasing polymerisation by adding a radical forming agent and heating and then isolating the suspended polymer when polymerisation has terminated and removing the solvent and residual monomer by steam distillation.

The graft polymers may be prepared in aqueous suspension. It is also possible that a prepolymer is first prepared in a reverse emulsion (water emulsified in the monomer-polymer mixture) and the reverse emulsion is then converted into a suspension of the prepolymer in water by the further addition of water when a certain proportion of monomer has been polymerised, polymerisation being then completed in the suspension of prepolymer in water.

The graft polymers may be prepared in aqueous suspension or a prepolymer may first be prepared in a reverse emulsion (water emulsified in the monomer-polymer mixture) and the reverse emulsion may then be converted into a suspension of the prepolymer in water by the further addition of water when a certain proportion of monomer has been polymerised, polymerisation being then completed in the suspension of prepolymer in water.

It is often advantageous to carry out subsequent cross-linking of the graft copolymer, for example by means of peroxides such as di-tert.butyl peroxide or dicumyl peroxide or by exposure to actinic light.

The moulding compounds according to the invention are generally obtained by vigorous mixing components A and B. Any known mixing processes may be employed for this purpose. The components of the moulding compound mixed in the required proportions are preferably extruded together through a screw extruder.

Alternatively, mixtures of the polymers may be prepared for example by mixing an emulsion of component A with a grafted ethylene/vinyl ester latex. The desired mixture of polymers may be isolated from the resulting emulsion by coagulation followed by washing with water or by spray drying.

If desired, solutions of the two components of the moulding compound may be mixed in solvents which are suitable for both components. Suitable solvents are e.g. chlorinated aliphatic and aromatic hydrocarbons such as methylene chloride, tetrachloroethylene and chlorobenzene, tetrahydrofuran or dimethylformamide. The moulding compounds can be isolated from the solutions by evaporating off the solvent or by precipitation with non-solvents. Suitable non-solvents are e.g. alcohols such as methanol, ethanol and isopropanol.

Alternatively, the suspensions of component A and of graft polymer which have been prepared in the aqueous phase or in organic solvents may be mixed together. Particularly suitable solvents or dispersing media are alcohols such as methanol, ethanol or tertiary butanol. Tertiary butanol is preferred. The moulding compound may be isolated by filtration or removal of the organic solvent by evaporation.

The moulding compounds according to the invention are suitable for producing any shaped products including films and filaments which are distinguished by their excellent mechanical properties and weather resistance.

In the following Examples, parts represent parts by weight and % represents percent by weight.

Preparation of the graft thermoplasts:

Graft polymer B 1

A solution of 800 g of an ethylene/vinyl acetate copolymer containing 45% by weight of vinyl acetate (melt index 3.6) in 1200 g of styrene and 397 g of acrylonitrile is heated to 80°C under nitrogen. A solution of 28 g of 1:1 copolymer of methacrylic acid and methyl methacrylate at pH in 3050 ml of water containing 0.8 g of sodium pyrosulphite is added with stirring. The autoclave is again flushed with nitrogen and heated to 140°C. After 30 minutes at 140°C a solution of 5 g of di-tert.-butyl peroxide in 100 g of allyl acetate is added. At the same time, a solution of 8 g of sodium dihydrogen phosphate and 1.8 g of $C_{12-14}$ ethyl sulphonate sodium in 2000 ml of water begins to be pumped in, and this operation is continued for 2 hours. 30 minutes after the first addition of peroxide, a further 5 g of di-tert.-butyl peroxide in 100 ml of allyl acetate are added. Stirring is continued for 4 hours at 140°C after the addition of aqueous emulsifier solution. Residual monomers are then removed by steam distillation. 1660 g of a product which has a melting point of 189°C and is insoluble in dimethylformamide and chlorobenzene are obtained after drying. The procuct contains 42.5% of ethylene/vinyl acetate copolymer as graft base on which 47.5% of styrene and 10.0% of acrylonitrile are grafted.

Graft polymer B 2

6000 ml of tert.-butanol, 2000 g of ethylene/vinyl acetate copolymer containing 45% by weight of vinyl acetate and 600 g of styrene are introduced into a 12 l stirrer autoclave. The autoclave is evacuated and flushed with nitrogen and 200 g of propylene are then forced in. The autoclave contents are heated to 85°C and stirred at this temperature for 2 hours. A solution of 3.0 g of benzoyl peroxide in 100 ml of tert.-butanol and 200 g of acrylonitrile are added under nitrogen. The mixture is stirred for 7 hours at 85°C. It is processed to yield 2280 g of a graft product which contains 88% ethylene-vinyl acetate polymer as graft on which 3.5% of acrylonitrile, 8% of styrene and about 0.5% of propylene are grafted.

Graft polymer B 3

8250 g of water, 726 ml of an 8.5% solution of dispersing agent (see B 1) and 2.64 g of sodium pyrosulphite are heated to 80°C under nitrogen in a 40 l autoclave. A solution in 4158 g of styrene and 1376 g of acrylonitrile of 3000 g of an ethylene/vinyl acetate copolymer which contains 45% of vinyl acetate is added to 80°C. Stirring is continued for one hour at 80°C and the following are then pumped in at uniform rate for 2 hours:

a. a solution of 8.25 g of tert.-butyl perpivalate in 400 g of allyl acetate and
b. a solution of 13 g of $C_{12-14}$ alkyl sulphonate sodium in 6600 g of water.

The reaction mixture is then stirred for 4 hours at 80°C. The bead polymer is freed from residual monomer by steam. 6830 g of a graft product containing 11.8% of acrylonitrile, about 52% of styrene and 36.0% of EVA polymer and having an intrinsic viscosity ($\eta$) of 2.58 in dimethylformamide at 25°C are obtained.

Graft polymer B 4

A solution of 336 g of styrene, 114 g of acrylonitrile, 450 g of an ethylene/vinyl acetate copolymer which has a vinyl acetate content of 45% by weight and 9 g of a graft product of styrene on a polyether (see German Auslegeschrift No. 1,137,554) is prepared in a 10 l stirrer vessel at 80°C under nitrogen. 171 g of a dispersing agent (see Example B 1), 2100 g of water and 0.9 g of benzene peroxide are then added and the mixture is stirred for one hour at 80°C. 2100 g of water containing 6 g of a $C_{12-14}$ alkyl sulphonate sodium are then added dropwise over a period of 30 minutes and the mixture is stirred for 5 hours at 80°C. 220 g of isobutylene are introduced during the reaction.

Processing of the reaction product yields 700 g of a graft product which contains 55% of ethylene/vinyl acetate copolymer as graft base and 6.1% of acrylonitrile, 38.5% of styrene and about 0.4% of isobutylene ($\eta$) in dimethylformamide at 25°C is 0.84).

Graft polymer B 5

3000 g of an ethylene/vinyl acetate copolymer which has a vinyl acetate content of 70% by weight (Mooney value 42), 3000 g of styrene and 9000 ml of tert.-butanol are heated to 70°C under nitrogen in a 20 l stirrer autoclave. 993 g of acrylonitrile are added when all the components have dissolved. 60 ml are then added from a solution of 13.5 g of tert.-butyl perpivalate in 150 ml of tertiary butanol. At the same time, the introduction of isobutylene into the reaction mixture is begun. 30 minutes after the first addition of peroxide, a further 60 ml are added and the remainder is added 30 minutes later. The reaction mixture is stirred for 2 hours at 70°C and 3 hours at 80°C. A total of 660 g of isobutylene is passed through the reaction mixture during the reaction time. Working up yields 5550 g of graft copolymer containing 12.2% of acrylonitrile, 33.5% of styrene, about 0.3% of isobutylene and 54% of EVA polymer ( ($\eta$) in dimethylformamide at 25°C 1.42).

Graft polymer B 6

400 g of an ethylene/vinyl acetate copolymer which has a vinyl acetate content of 45% by weight and 1600 g of styrene are introduced into a 12 l stirrer autoclave under nitrogen. The autoclave is evacuated and washed free from air with nitrogen. 200 g of propylene are then added. The reaction mixture is heated to 85°C and stirred until the solution is homogeneous. 530 g of acrylonitrile, 150 ml of a dispersing agent (see B 1) and 2000 ml of conductivity water are then added. The mixture is stirred at 85°C for 15 minutes and 3 g of tert.-butyl perpivalate in 20 ml of paraffin oil are then added over a period of 10 minutes. After a further 2 hours of stirring at 85°C, 3.75 tert.-butyl perpivalate in 15 ml of paraffin oil, 110 ml of a 5% methyl cellulose solution and 2000 ml of water are added. After a further 8 hours stirring at 85°C, processing of the reaction product yields 2320 g of a graft product which contains 17.5% of EVA polymer as graft base on which are grafted 19.7% of acrylonitrile, 61.5% of styrene and 1.3% of propylene.

The substances used as component A may be commercial styrene-acrylonitrile resins such as Luran 368 R of BASF which consists of about 70% of styrene and 30% of acrylonitrile or styrene/acrylonitrile copolymers prepared by special processes such, for example, as those described in U.S. Pat. No. 2,833,746 or German Offenlegungsschrift Nos. 2,142,617 or 2,057,250.

Example for the preparation of a special SAN resin.

Thermoplast A 1

6000 g of styrene, 1985 g of acrylonitrile, 52,500 ml of water, 400 g of $C_{12-14}$-alkyl sulphonate sodium, 0.5 g of iron (II) ammonium sulphate and 16.2 g of ascorbic acid are introduced into a 127 l stirrer autoclave under nitrogen. The autoclave is evacuated and flushed with nitrogen. 2000 g of propylene are then forced in. The autoclave contents are heated to 40°C and stirred for 30 minutes at 40°C. 600 ml of solution A which has been prepared from 48.6 ml of 30% hydrogen peroxide diluted to 3000 ml with water are then added. After 30 minutes' stirring at 40°C, solution B of 18,000 g of styrene and 5955 g of acrylonitrile begins to be pumped in continuously. After the introduction of solution B has begun, both solution A and solution C which is composed of 48.6 g of ascorbic acid diluted to 2400 ml with water begin to be pumped in at the same time and continue to be pumped in for 3 hours. The pumping time for solution B is also three hours. Stirring is continued for one hour at 40°C after the addition of A, B and C has been completed. Precipitation and removal of the salt and volatile constituents yields 26,600 g of a SAN resin which is composed of 76% of styrene and 24% of acrylonitrile and has an intrinsic viscosity ($\eta$) in dimethylformamide at 25°C of 1.54.

Thermoplast A 2

6720 g of styrene, 2226 g of acrylonitrile, 24 g of tert.-butyl perpivalate, 850 ml of a 10% solution of a dispersive agent (1:1 copolymer of methacrylic acid and methyl methacrylate adjusted to pH 6 with sodium hydroxide solution), 8500 ml of water and 2.8 g of sodium pyrosulphite are introduced into a 40 l stirrer autoclave. The autoclave is evacuated and flushed with nitrogen. The contents are heated to 80°C and a solution of 6.3 g of a $C_{12-14}$-alkyl sulphonate sodium in 10,500 ml of water is added over a period of 4 hours. The reaction mixture is then stirred for 2 hours at 80°C. The bead polymer is isolated and dried. 11950 g of a resin which has an intrinsic viscosity ($\eta$) in dimethylformamide of 1.16 are obtained. The resin is extruded to form small standard test rods which are tested for ageing in a weatherometer.

Conditions:
Carbon arc lamp. Rotating sample drum and spray apparatus.
Spraying cycle: 17 minutes exposure to light
3 minutes exposure to light and spraying
Black panel temperature: 42°C before spraying
22°C after spraying.

| Time of exposure to light (hours) | 0 | 500 | 1000 |
|---|---|---|---|
| Impact strength kpcm/cm² | 35 | 15 | 10 |

Results of outdoor weathering:
After 18 months the impact strength has dropped from 33 kp/cm/cm² to 3–4 kpcm/cm².
(Exposure to weathering in open terrain in Engerfeld).

EXAMPLES 1–6

Graft polymers and SAN resins of various compositions are homogenised on rollers at 170° to 180°C for 10 to 20 minutes. The rolled sheets are then granulated and extruded to form small standard test rods.

Compositions of the moulding compounds in Examples 1 – 6:

| | 1 | 2 | 3 | 4 | 5 | 6 |
|---|---|---|---|---|---|---|
| Basic graft polymer | B 2 | B 4 | B 3 | B 6 | B 1 | B 5 |
| Basic SAN resin | A 2 | A 1 | Luran$^R$ | A 1 | A 1 | A 1 |
| Ethylene/vinyl acetate content of the mixture | 15.2 | 17 | 19.8 | 5.25 | 23.0 | 27.0 |

The mixtures were extruded to form small standard test rods which were subjected to an ageing test in a weathermometer. The conditions for this test have already been indicated under "Thermoplast A 2".

| Property | Test method | Measuring unit | 1 | 2 | 3 | 4 | 5 | 6 | SAN Type $A_1$ |
|---|---|---|---|---|---|---|---|---|---|
| Impact strength | DIN 53453 | cm kp/cm² | 8/77*) | 60 | 70 | 60 | 44 | 71 | 34 |
| Notched impact strength | DIN 53453 | cm kp/cm² | 5 | 7 | 5.7 | 4.7 | 8 | 12 | 3.6 |
| Bending-E modulus | DIN 53452 | kp/cm² | 24.10³ | 19.10³ | 22.10³ | 23.10³ | 14.10³ | 17100 | 36.10³ |
| Ball indentation hardness $H_K30$ | tentative DIN standard 53456 | kp/cm² | 950 | 720 | 770 | 920 | 510 | 680 | 1620 |
| Dimensional stability under heat according to Vicat | DIN 53460 | °C | 100 | 89 | 94 | 102 | 72 | 81 | 110 |
| Impact strength after 1000 hours exposure to light | DIN 53453 | cm kp/cm² | 8/77 | 60 | 70 | 60 | 45 | 70 | 15 |
| Impact strength after 1500 hours exposure to light | DIN 53453 | cm kp/cm² | 8/77 | 60 | 70 | 60 | 44 | 72 | 8 |

*)8/77 = 8 standard test rods broken at 77 cm kp/cm²

EXAMPLE 7

55 Parts of a SAN resin A 1; and 45 parts of a graft polymer B 3 were homogenised on rollers at 215°C. The rolled sheet was granulated and extruded to produce small standard test rods. The following mechanical properties are measured:

| | | |
|---|---|---|
| Impact strength according to | DIN 53 453 | 74 cm kp/cm² |
| Notched impact strength to | DIN 53 453 | 7 cm kp/cm² |
| Bending E modulus to | DIN 53 452 | 1900 kp/cm² |
| Ball indentation hardness $H_K30$ Ball indentation hardness tentative DIN standard | 53 456 | 670 kp/cm² |
| Dimensional stability | | | under heat according to Vicat     DIN 53 460     85°C

EXAMPLE 8

A mixture of 70 parts of a graft polymer B 3 with 30 parts of a SAN resin A 1 is prepared in a double screw extruder. The extruded test rods (I) were subjected to an ageing test. Test samples (II) were also produced from a mixture of butadiene graft copolymer and 30 parts of SAN resin type A and subjected to an ageing test in a weatherometer.

Conditions:
Carbon arc lamp.    Rotating sample drum and spray apparatus.
Spraying cycle:    17 minutes exposure to light
   3 minutes exposure to light and spraying
Black panel temperature: Before spraying 42°C
   after spraying 22°C

| | 100 | 300 | 500 | 800 | 1000 hours |
|---|---|---|---|---|---|
| I | unb. | unb. | unb. | unb. | unb. |
| II | unb. | 10 | 8 | 8 | 8 | unb. = unbroken

The results shown here are supplemented and confirmed by comparative ageing tests on ABS and ASA polymers by J. Zelinger and E. Wolfova in Kunststoffe, Vol. 63 (1973), Volume 5, pages 319–324.

We claim:
1. A composition of
   A. 10 to 90% by weight of a copolymer of
      I. 10 to 85% by weight of acrylonitrile, methacrylonitrile or a mixture thereof and
      II. 10 to 90% by weight of at least one aromatic vinyl compound, the sum of components I to II being 100 and
   B. 10 to 90% by weight of a graft copolymer of
      III. 10 to 70% by weight of an ethylene/vinyl ester copolymer containing 25 to 75% by weight of grafted vinyl ester and
      IV. 90 to 30% by weight of polymerized units of
         a. 15 to 85% by weight of acrylonitrile, methacrylonitrile or a mixture thereof,
         b. 85 to 15% by weight of at least one aromatic vinyl compound and
         c. 0.1 to 10% by weight of at least one aliphatic monoolefin containing 2 to 18 carbon atoms, the sum of A + B being 100, the sum of III and IV being 100 and the sum of components (a) to (c) being 100.

2. The composition as claimed in claim 1 which contains from 30 to 75% by weight of component A and 25 to 70% by weight of component B, the sum of A + B being 100.

3. The composition as claimed in claim 1 in which component B comprises from 35 to 55% by weight of component III, and 65 to 45% by weight of component IV, the sum of III and IV being 100.

4. The composition as claimed in claim 1 in which component IV comprises polymerized units of
   a. 15 to 35% by weight of acrylonitrile, methacrylonitrile or a mixture thereof,
   b. 65 to 85% by weight of at least one aromatic vinyl compound and
   c. 0.1 to 10% by weight of at least one aliphatic monoolefin having 2 to 18 carbon atoms, the sum of (a), (b) and (c) being 100.

5. The composition as claimed in claim 1 in which component II is styrene, styrene nuclearly substituted with alkyl having 1 to 5 carbon atoms, halogenated styrene or a mixture thereof.

6. The composition as claimed in claim 1 in which component II is 4-methylstyrene, α-methylstyrene or 4-chlorostyrene.

7. The composition as claimed in claim 1 in which component III comprises an ethylene/vinyl ester copolymer containing 35 to 55% of vinyl ester.

8. The composition as claimed in claim 1 in which component III comprises an organic vinyl ester of a saturated monocarboxylic acid having 1 to 18 carbon atoms which may be substituted by halogen or an organic vinyl ester of an aromatic monocarboxylic acid having 7 to 11 carbon atoms.

9. The composition as claimed in claim 1 in which component III is vinyl formate, vinyl acetate, vinyl propionate, vinyl chloropropionate, vinyl butyrate, vinyl isobutyrate, vinyl caproate, vinyl laurate, vinyl myristate, vinyl stearate or vinyl benzoate.

10. The composition as claimed in claim 1 in which component b is styrene, styrene nuclearly substituted with alkyl having 1 to 5 carbon atoms or halogenated styrene.

11. The composition as claimed in claim 9 in which component c is a monoolefin having 2 to 8 carbon atoms.

12. The composition as claimed in claim 9 in which component c is ethylene, propylene, butene-1, isobutylene, 2-methylbutene-2, 3-methylbutene-1, diisobutylene, triisobutylene, pentene-1, 4-methylpentene-1, octadecene-1, cyclopentane or a mixture thereof.

* * * * *